June 5, 1962 J. H. JACOBS Re. 25,181

ADJUSTABLE LATHE CENTER

Original Filed Dec. 20, 1952

INVENTOR
JOSEPH H. JACOBS
BY
Williamson, Schroeder & Palmatier
ATTORNEYS

United States Patent Office

Re. 25,181
Reissued June 5, 1962

25,181
ADJUSTABLE LATHE CENTER

Joseph H. Jacobs, Fort Myers, Fla., assignor to Jacobs Wind Electric Company, Fort Myers, Fla., a corporation of Montana Original No. 2,847,890, dated Aug. 19, 1958, Ser. No. 327,121, Dec. 20, 1952. Application for reissue Jan. 13, 1960, Ser. No. 2,317
5 Claims. (Cl. 82—33)

Matter enclosed in heavy brackets [ ] appears in the original patent but forms no part of this reissue specification; matter printed in italics indicates the additions made by reissue.

This invention relates to a device for facilitating centering work on a lathe.

Many different conditions can cause misalignment between the headstock and tailstock centers, such as shifting the headstock to a new position on the lathe ways, unequal pressure when locking the headstock in position each time, slight warping of the lathe bed due to unequal changes in temperatures in the various parts thereof, unequal movement of work away from the cutting tool as the cut progresses, and many other variable conditions.

It is an object of my present invention to provide an extremely simple, yet highly efficient, adjustable lathe center which is calibrated to read directly the amount of adjustment made by movement thereof and which thereby permits quick and easy adjustment of the center to correct any misalignment between the two lathe centers.

More specifically, it is an object to provide an adjustable lathe center having the centering point thereof eccentrically ground relative to the main body or shank of the center so that rotation within the mounting taper will produce lateral adjustment of the center point and one end of the work mounted thereon.

Still more specifically, it is an object to provide a tapered mounting for a lathe center in which the center is [concentrically] *adjustably* mounted for controlled rotation on the longitudinal axis, the center point being positioned eccentrically of said longitudinal axis of rotation and the two relatively rotatable parts being calibrated to read directly the amount of lateral shifting movement of the center point produced by a selected increment of controlled rotation of said point within the tapered mounting member.

It is still another object to provide a lathe center having a pair of relatively rotatable parts constructed to permit the resistance to rotation thereof to indicate the degree of pressure exerted by the centering points against the work to permit said pressure to be varied prior to the working cut in order to permit precision work to be produced without overheating of the centering points or the work.

These and other objects and advantages of this invention will more fully appear from the following description, made in connection with the accompanying drawings, wherein like reference characters refer to the same or similar parts throughout the several views, and in which:

*FIG. 2 is a cross sectional view thereof taken approximately along line 2—2 of FIG. 1 and looking in the direction of the arrows;*

Figure 1:
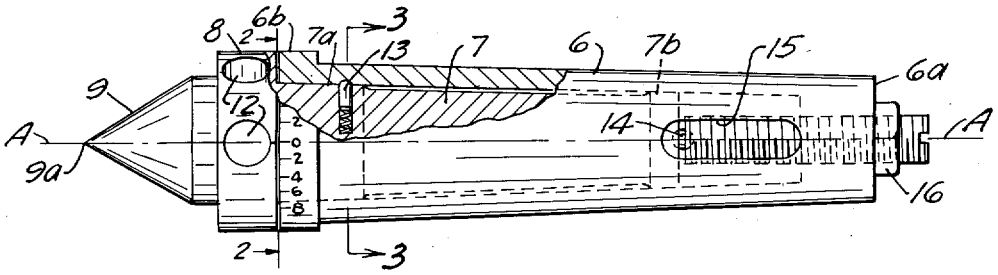
FIG. 1 is a side elevational view of my improved centering point concentrically mounted within a conventional lathe mounting taper with a portion thereof being shown in section.
Figure 2:
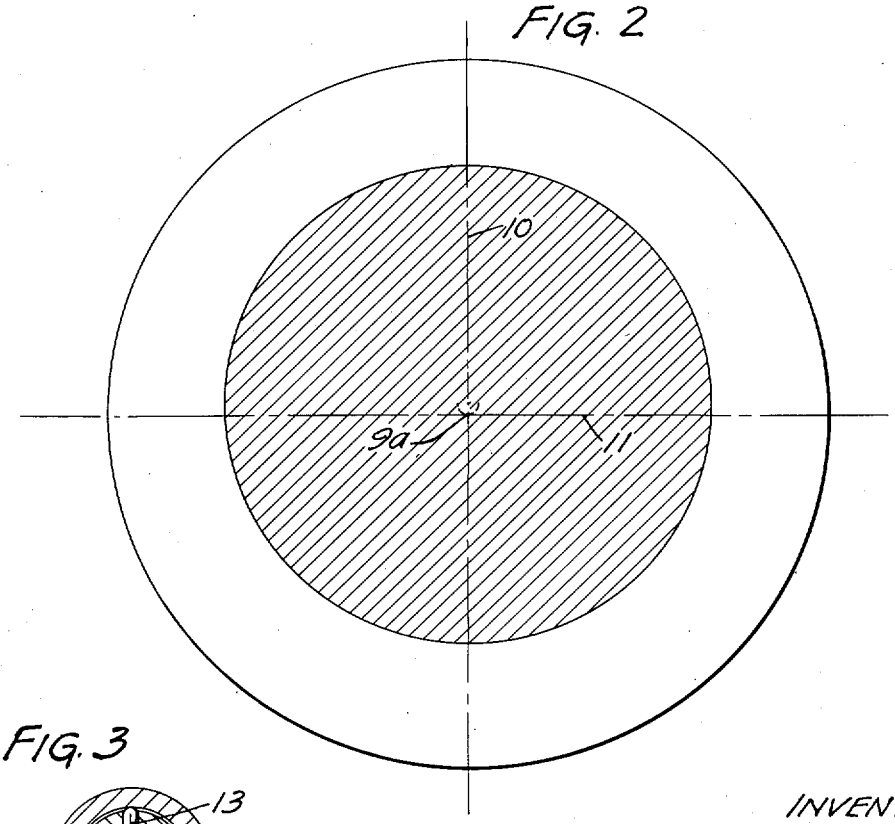
[FIG. 2 is a front end elevational view thereof with intersecting vertical and horizontal section line planes indicating the axis of concentricity of the assembly and showing the center point disposed eccentrically thereof at zero setting with a dotted line indicating the path of adjustment movement of the lathe center point; and]
Figure 3:
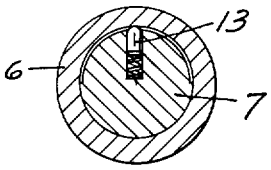
FIG. 3 is a transverse section taken substantially along the line 3—3 of FIG. [2] *1*.

As illustrated in the accompanying drawings, I have provided a mounting member such as a hollow mounting taper 6 constructed in the form shown to be received in a conventional [headstock] mounting assembly (not shown) *of a lathe and which* has a thickened end portion 6b. The inside as well as the outside, of said hollow mounting taper 6 is tapered toward the end 6a thereof [and the] *as best seen in FIG. 1. Referring now to FIG. 2, it will be seen that the exterior surface and the interior hollow portion of mounting taper 6 are substantially circular in cross sectional configuration.* This interior hollow concentrically tapered portion rotatably receives the center point member having an elongated tapered body or shank portion 7 of the lathe center and the central portion of said shank 7 is cut away to provide spaced bearing surfaces 7a and 7b only at the respective end portions thereof to permit controlled manually selected rotation of shank 7 within mounting taper 6. This tapered interfitting between the body 7 and the mounting taper 6 is of course concentric to the longitudinal axes of of the two parts making said axes coincident. An enlarged shoulder 8 is formed around the end portion of the center disposed adjacent the thickened end 6b of the mounting member 6 and is slightly spaced therefrom. The tip portion 9 of shank 7 is tapered to form a center point 9a and is eccentrically ground relative to the longitudinal axis of the body or shank 7 and is [of course] eccentric relative to the longitudinal axis of rotation thereof.

The point 9a of the center is shown in FIG. 2 disposed in the vertical center line plane indicated at 10, but being eccentrically upwardly offset from the horizontal center line plane indicated at 11. This position of the point 9a will be referred to as a zero setting on my adjustable lathe center. The calibrations shown in FIG. 1 indicate the amount which the center point 9a is shifted laterally of the vertical center line plane 10 by manually rotating the center shank 7 concentrically within the mounting taper 6. In the form shown, a pair of radially disposed cylindrical recesses 12 are provided in the enlarged shoulder 8 to permit insertion of a turning rod or lever to facilitate rotation of the center shank 7 within the mounting taper 6. A spring pressed pin 13 is provided to retain the mounting tape 6 and center shank or body 7 together and, in the form shown, is mounted in the body 7 of the lathe center and rides in a semi-circular groove formed around the adjacent inside portion of mounting taper 6. This structure, while retaining the shank 7 of the center within the mounting taper 6, also limits the rotation thereof to 90° in either direction from zero setting. The diminished end of the shank 7 rides on a rotatable ball 14 which is seated in a pair of cooperating recesses respectively formed in said diminished shank end and the inner end of a releasing projection screw 15 threadably inserted through the end portion of the mounting taper 6. A lock nut 16 is provided to securely lock the releasing screw 15 in the desired position. This releasing screw is positioned so that the ball 14 will receive a portion of the thrust against the point 9a and the remainder of said thrust will [of course] be taken by the engaged portions of mounting taper 6 and end bearing portions 7a and 7b. Obviously the screw 15 can be adjusted to prevent the shank 7 from becoming so tightly pressed into the hollow mounting taper 6 as to prevent relative rotation between the parts, thus insuring ease of adjustment at all times.

The following is a description of the operation of my adjustable lathe center. When the work has been *so* positioned in the lathe, a sample cut may be made thereon to determine the centering and alignment of the work between the lathe head and tailstocks. The taper of the sample cut is measured in the conventional manner and the taper of the entire length of the work is easily computed therefrom. This of course would be the taper produced by a cut extending the full length of the workpiece with the work mounted in out of alignment off-center relation. The correction to center the work is of course one-half the total taper thus computed and the work can easily be adjusted to center by shifting the headstock center *point 9a* a distance equal to one half of the computed taper produced by the off-center relationship. This is of course done by rotating the enlarged shoulder 8 in the desired direction from the zero initial setting thereof and the calibrations then directly read the required corrected adjustment. The work will then be precisely centered between the head and tailstock centering points and no further adjustment will be necessary. The frictional resistance to relative rotation between the mounting taper and the lathe center body 7 will maintain the adjusted position of the centering point 9a while the work is being processed in the lathe. The rotation of shank 7 within mounting taper 6 is of course facilitated by insertion of a turning lever, not shown, into one of the cylindrical recesses 12, the mounting taper being securely anchored against rotation in a conventional manner. The resistance to rotation between the two parts indicates the pressure being exerted on the work by the head and tailstock centering points to permit the same to be adjusted before the work becomes overheated if the pressure exerted is indicated as being excessive and also of course permits the pressure to be increased if the same has been indicated as too little for accurate work.

The arc of shifting movement of the point 9a is indicated by the small central semi-circular arc shown in FIG. at the center of the assembly, the full line circle of course indicates concentric mounting of the body 7 within the mounting taper 6. In other words, as has been previously stated, the body 7 of the lathe point is concentrically detatably mounted within the mounting taper 6 and the point 9a is eccentrically offset relative to the longitudinal axis of rotation of the body 7 within the mounting taper 6. As has been previously stated, the spring pressed pin 13 retains the two parts 6 and 7 together, but also permits separation thereof as by projecting the screw 15 into the mounting taper to cam the pin 13 downwardly and release the same from the groove in which said pin normally rides.

It will be seen that I have provided a relatively simple adjustable lathe center which produces quick and precise correction of misalignment between the head and tailstock after tips and maintains an adjustment during the cutting operation of the work. The center point is eccentrically offset and constructed [arranged] in a manner so that at a zero setting the said point is positioned in the vertical center line plane through the axis of rotation of the shank 7 within the mounting member 6 to produce a maximum of lateral shifting movement during the initial adjustment rotation of the shank within the mounting member. Obviously, the point 9a is shifted downwardly somewhat during the lateral adjustment thereof. However, since the cutting operation is performed along the axis of the work, this lowering of the point has no appreciable effect on the accuracy of the work being done.

It will, of course, be understood that various changes may be made in the form, details, arrangement and proportions of the parts without departing from the scope of this invention which, generally stated, consists in the matter shown and described herein and set forth in the appended claims.

What is claimed is:

1. An adjustable lathe center comprising a center point member having an elongated shank with gradually tapered portions and having a pointed work mounting tip with the point thereof disposed eccentrically of the longitudinal axis of said tapered shank portions, a mounting member having a hollow portion with cooperating gradually tapered portions for cooperatively receiving in concentric relation the gradually tapered shank portions of the center point member to frictionally engage the same and hold said shank against rotation during rotation of the work on the mounting tip, and a thrust resisting member carried by said mounting member and engaging said shank to carry only a portion of the thrust on said shank and positively limit the frictional resistance to rotation between said shank and said mounting member to permit said shank to be forcibly rotated within said mounting member to laterally adjust the eccentrically mounted pointed tip.

2. The structure set forth in claim 1 and a graduated scale on one of said members with indicia means on the other member to permit the increment of lateral adjustment of the center tip to be read directly on said scale.

3. The structure set forth in claim 1 and releasable means for normally retaining said two members in interfitted relation.

4. The structure set forth in claim 1 and said thrust resisting member including an externally threaded screw threadably received longitudinally through the outer end portion of said mounting member for longitudinal adjustment with respect thereto with the inner end of said screw disposed in engagement with the adjacent end of said center point member and in substantially axial alignment therewith when said center point member is in interfitted frictionally engaged relation with the mounting member.

*5. An adjustable lathe center comprising a center point member having an elongated shank with gradually tapered portions and having a pointed work mounting tip with the point thereof disposed eccentrically of the longitudinal axis of said tapered shank portions, the mounting member having a hollow portion with cooperating gradually tapered portions for cooperatively receiving the gradually tapered shank portions of the center point member to frictionally engage the same and to hold said shank against rotation during rotation of the work on the mounting tip, and a thrust resisting member carried by said mounting member and engaging said shank to carry only a portion of the thrust on said shank and positively limit the frictional resistance to rotation between said shank and said mounting member to permit said shank to be forcibly rotated within said mounting member to laterally adjust the eccentrically mounted pointed tip, said thrust resisting member including an externally threaded screw threadably received longitudinally through the outer end portion of said mounting member for longitudinal adjustment with respect thereto with the inner end of said screw disposed in engagement with the adjacent end of said center point member and in substantially axial alignment therewith when said center point member is in interfitted frictionally engaged relation with the mounting member.*

References Cited in the file of this patent or the original patent

UNITED STATES PATENTS 963,559 Hines ---------- July 5, 1910

(Other references on following page)

UNITED STATES PATENTS

| | | |
|---|---|---|
| 1,338,451 | Hoover | Apr. 27, 1920 |
| 1,391,034 | Williams | Sept. 20, 1921 |
| 1,442,364 | Schnelle | Jan. 16, 1923 |
| 1,967,004 | Braden | July 17, 1934 |
| 2,189,242 | Edwin | Feb. 6, 1940 |
| 2,247,721 | Wright | July 1, 1941 |
| 2,398,661 | Miller | Apr. 16, 1946 |
| 2,486,044 | Lusk | Oct. 25, 1949 |

FOREIGN PATENTS

| | | |
|---|---|---|
| 70,820 | Norway | Aug. 5, 1946 |
| 271,195 | Switzerland | Jan. 16, 1951 |
| 495,058 | France | June 15, 1919 |

OTHER REFERENCES

"American Machinist," vol. 42, No. 15, page 616, April 15, 1915.